(12) United States Patent
Curran-Gray et al.

(10) Patent No.: US 7,633,939 B2
(45) Date of Patent: Dec. 15, 2009

(54) IN-LINE NETWORK SIMULATOR

(75) Inventors: Martin Curran-Gray, Fife (GB);
Slawomir K. Ilnicki, Los Altos Hilla, CA (US); Andrew Lehane, Kinross-Shire (GB)

(73) Assignee: Agilent Technologies, Inc., Santa Clara, CA (US)

( * ) Notice: Subject to any disclaimer, the term of this patent is extended or adjusted under 35 U.S.C. 154(b) by 699 days.

(21) Appl. No.: 11/127,350

(22) Filed: May 12, 2005

(65) Prior Publication Data
US 2006/0256720 A1 Nov. 16, 2006

(51) Int. Cl.
*H04L 12/28* (2006.01)
(52) U.S. Cl. .................. 370/389; 370/395.42
(58) Field of Classification Search .......... None
See application file for complete search history.

(56) References Cited

U.S. PATENT DOCUMENTS

| | | | |
|---|---|---|---|
| 5,481,735 A | 1/1996 | Mortensen et al. | |
| 6,442,141 B1 | 8/2002 | Borella et al. | |
| 6,560,720 B1 | 5/2003 | Chirashnya et al. | |
| 6,563,796 B1 | 5/2003 | Saito | |
| 6,820,042 B1 | 11/2004 | Cohen et al. | |
| 6,862,291 B2 | 3/2005 | Talpade et al. | |
| 6,886,029 B1 | 4/2005 | Pecus et al. | |
| 2002/0085501 A1 | 7/2002 | Guven et al. | |
| 2002/0105921 A1 | 8/2002 | Sawyer et al. | |
| 2002/0169815 A1 | 11/2002 | Wong et al. | |
| 2004/0005896 A1* | 1/2004 | Davis et al. | 455/446 |
| 2004/0196792 A1* | 10/2004 | Davies et al. | 370/235 |
| 2005/0169186 A1* | 8/2005 | Qiu et al. | 370/242 |
| 2006/0083231 A1* | 4/2006 | Jeffay et al. | 370/389 |

FOREIGN PATENT DOCUMENTS

| | | |
|---|---|---|
| WO | 0141365 A1 | 6/2001 |
| WO | WO 02 011413 | 2/2002 |

OTHER PUBLICATIONS

GB Search Report dated Aug. 10, 2006.
DE Appl. No. 102006012427.8 filed Mar. 17, 2006 Office Action dated Apr. 29, 2008 This office action is from the German counterpart application, and recites the other documents in this Information Disclosure Statement.

* cited by examiner

*Primary Examiner*—William Trost, IV
*Assistant Examiner*—Raj Jain

(57) ABSTRACT

An in-line network simulator is provided that disrupts packets traveling through it to simulate network conditions. According to one embodiment, a method comprises receiving, at an in-line network simulator, packets sent from a source node to a destination node. The in-line network simulator classifies the received packets into respective ones of a plurality of different classifications, and disrupts the received packets based on corresponding disruption characteristics defined for their respective classifications. Such disrupting of the packets may include selectively performing at least one of delaying, dropping, and reordering of the received packets.

25 Claims, 5 Drawing Sheets

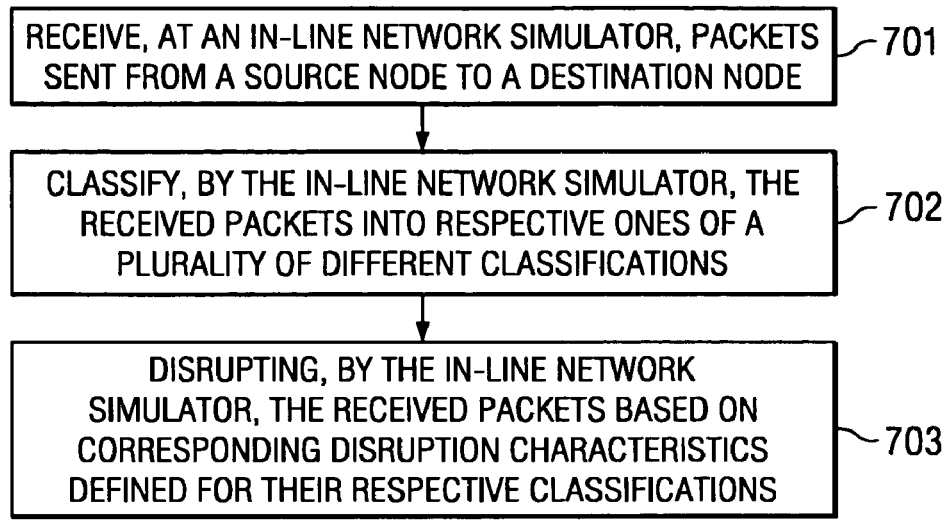
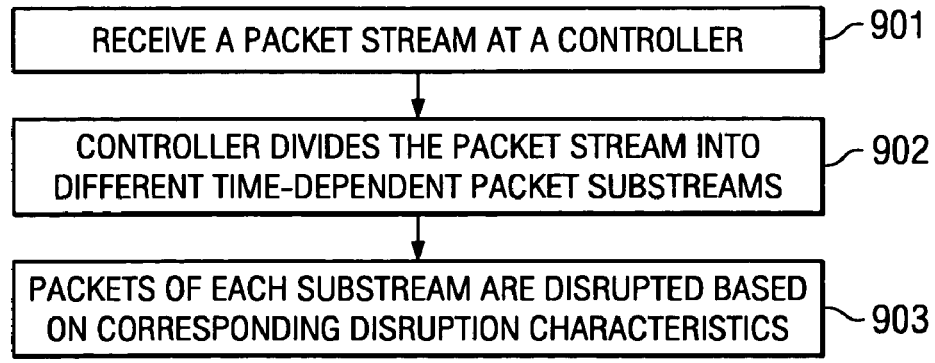

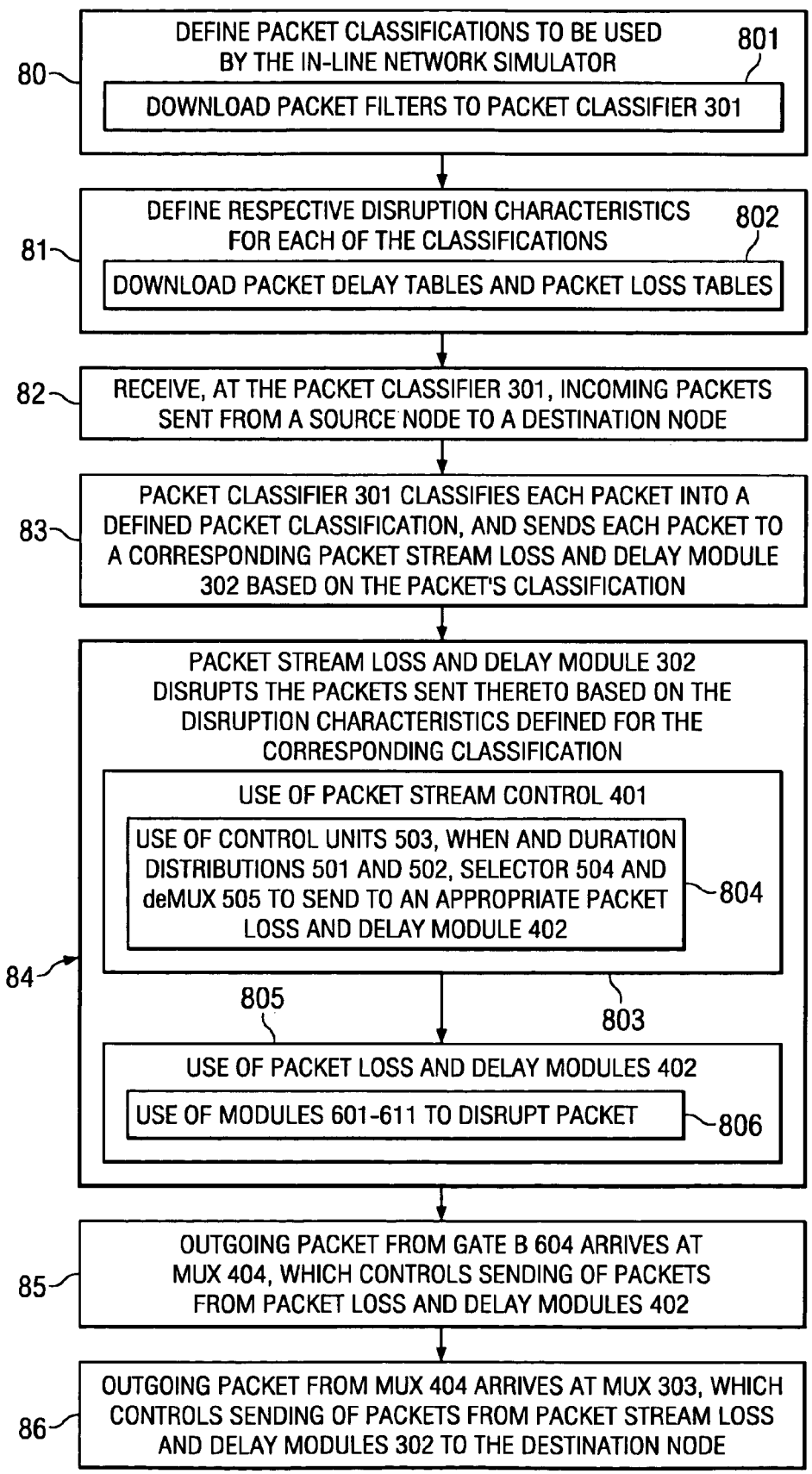

IN-LINE NETWORK SIMULATOR

BACKGROUND OF THE INVENTION

Today, communication networks are widely used. Various types of communication networks exist, including without limitation the Internet and other wide-area networks (WANs), local-area networks (LANs), telephony networks, and wireless networks. Additionally, many different communication protocols exist today. Information is often communicated across communication networks from a source (or "sender") to one or more destinations. Various types of communication are supported via communication networks, such as standard telephony calls, voice-over-IP (VoIP) calls, wireless telephony calls (e.g., via a cellular network), television programming (e.g., via cable and/or satellite networks), data file transfers, electronic mail, instant messaging, web pages, streaming media, video-conferencing, etc. Thus, various types of devices and applications are commonly deployed in and are expected to operate properly in a networked environment (e.g., in which communication to/from the devices/applications travels across a network). As such, it is often desirable to test/analyze the behavior of devices/applications in a networking environment. Thus, testing network equipment, providing network capacity planning, and in some cases troubleshooting distributed applications requires use of a networking environment. For example, such testing may observe how network equipment or distributed applications behave under certain network traffic conditions in which packets are delayed, lost, and/or sent out of order.

For testing purposes and even for network capacity planning, using a real network may not always be possible or desirable. Use of a specialized experimental network may often be prohibitively expensive, and therefore network simulators are often used instead, especially when the user would like to observe the effects of communication between networks, networking elements or even distributed applications across some network that provides a variable quality conduit for this communication. Thus, a network simulator may be employed for use in examining how packet delays, packet loss, packet reordering (and/or other conditions that may be encountered for communication across a network) affect the behavior of the communicating parties.

Various network simulators are known. Network simulators can be standalone devices that simulate a network's behavior, or they can be connected to real devices or networks. Testing of network equipment is often performed using simulated networks that have several sources of data traffic that create superficial network traffic loads. PC/system-based network simulators may be used for simulating slow-speed networks. At higher speeds (e.g., gigabit network speeds), processing data may require devices with specialized hardware-assistance for simulation. This means, however, that such systems generally become more complex and more expensive. Existing network simulators are therefore typically complex, expensive, and difficult to deploy. Additionally, their footprint is generally large.

Special-purpose network simulators have been developed that are targeted specifically for simulating a given type of communication on a network, such as simulating VoIP traffic. Many network simulators are operable to inject traffic into a system. That is, many traditional network simulators inject network traffic to a system under test. Such network simulators create artificial traffic that is injected for observing the effects of the artificial traffic on certain network elements, such as switches and/or routers. Accordingly, the traditional network simulators simulate traffic of a source by injecting artificial traffic into a network for stressing routers and/or switches, for example. In some cases, the network simulators are the source and destinations, and they create artificial traffic to be injected in a network from the source to the destination for observing the effects of such artificial traffic (e.g., on network equipment and/or applications executing at the source and/or destination). As an example, traditional network simulators may create synthetic loads on the network that will affect routers/switches and thus affect the traffic to be analyzed. For instance, a router tester may be used for checking for compliance and also to stress routers with artificial traffic. A service provider may use such a router tester to see if specific routers meet their demands for bandwidth, latency, etc. The router tester may send a specified number of packets per second to enable analysis of how a specific router will behave under the synthetic workload.

SUMMARY OF THE INVENTION

Embodiments of the present invention provide an in-line network simulator that disrupts packets traveling through it to simulate network conditions. As used herein, an "in-line" network simulator refers to a network simulator that disrupts actual network traffic directed from a first node to a destination node. As described herein, the traffic is disrupted to simulate the effects of the traffic being communicated across a particular network with certain characteristics (e.g., certain congestion, etc.), as opposed to creating synthetic loads and injecting traffic into the network. Thus, rather than actively injecting traffic into a communication path to create network conditions, as is done by many traditional network simulators, embodiments of the present invention provide a passive network simulator that can monitor traffic flowing between nodes (e.g., devices, applications, processes, or any other objects that may communicate across a network) and disrupt such traffic, e.g., by dropping packets, delaying packets, reordering packets, etc., to simulate disruptions that may be encountered in a real network. Thus, rather than generating artificial traffic to be inserted into a network environment, certain embodiments of the present invention act on actual traffic that it observes between nodes of a network and disrupts such traffic so as to simulate the effects that a network may have on the actual traffic (e.g., due to congestion that may be present in the network, etc.). Certain embodiments are implemented in hardware, which enable high-speed (e.g., high parallelism) and small footprint. Further, certain embodiments are general-purpose network simulators that are capable of handling any type of traffic and simulating any desired network conditions.

In certain embodiments of the present invention, packets received by the network simulator are classified into one of a plurality of different classifications (or "streams"), and different packet disruption characteristics (e.g., amount of packet delays, frequency of packet loss, etc.) can be defined for each of the different classifications. For instance, different disruption characteristics can be defined for UDP-type of packets than for TCP-type of packets. Routers and other equipment often handle different communication protocols differently, and thus different disruption characteristics can be defined to simulate such different handling of various communication types across a network. As another example, the sender/recipient of the packet may, in some implementations, affect its classification. For instance, nodes (representing nodes of different customers) may be assigned different levels of service (e.g., gold, silver, or bronze levels of service) depending on the customer's service level agreements (SLAs). Such arrangements are sometimes found in real networks, in which different disruption characteristics may be encountered for the packets of nodes assigned different levels of service (e.g., gold-level nodes may receive higher quality service than silver or bronze level nodes). Accordingly, certain embodiments of the present invention enable simulation of this situation by classifying received packets and assigning different packet disruption characteristics to each classification.

In certain embodiments, the network simulator device itself performs a very simple function of packet delay, loss and reordering, but it is driven by network characteristics (or "disruption characteristics") which may be loaded from a more powerful device, like a controlling station, such as a PC/laptop, workstation or server. In certain embodiments, a controlling station downloads statistical distributions of packet delays, loss tables or captured distribution characteristics of real networks. Again, different statistical distributions may be downloaded for different packet classifications. These captured distribution characteristics of packet delays and loss could be either from a "live" network or could be coming from previously recorded/captured data.

Certain embodiments of the present invention provide a small network simulator that may be plugged into networking equipment or even directly into communicating devices, and simulate a network traffic load that will cause various packet delays, packet loss or packet reordering. As discussed further herein, implementations are disclosed that enable a network simulator having small footprint, and yet providing a very flexible general-purpose device with the flexibility of a large network simulator at a fraction of the cost. For instance, in certain embodiments the network simulator is sufficiently small that it can fit inside small devices like GBICs (GigaBit Interface Converters) or SFPs (Small Form Factor Pluggables) that are plugged directly into the user network equipment or even the user PC, workstation or server. Such a network simulator may be implemented as an ASIC or a FPGA device, and may serve as a gigabit speed network simulator in certain embodiments. While various exemplary applications of such a network simulator are described further herein as targeting Metro Ethernet Networks, they are not limited in application and thus could likewise be applied for simulating almost any network. The exemplary embodiments described further herein, may be used, for example, as a simulator of any packet data communication link that creates packet delays, losses and packet reordering, e.g., Virtual Private Network (VPN) tunnels.

According to one embodiment of the present invention, a method comprises receiving, at an in-line network simulator, packets sent from a source node to a destination node. The in-line network simulator classifies the received packets into respective ones of a plurality of different classifications, and the in-line network simulator disrupts the received packets based on corresponding disruption characteristics defined for their respective classifications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 7 shows an operational flow diagram for certain embodiments of the present invention;

FIG. 8 shows a more detailed operational flow diagram for the exemplary embodiment of an in-line network simulator described above in FIGS. 3-6; and FIG. 9 shows an operational flow diagram for one embodiment of the present invention.

DETAILED DESCRIPTION

Figure 1:
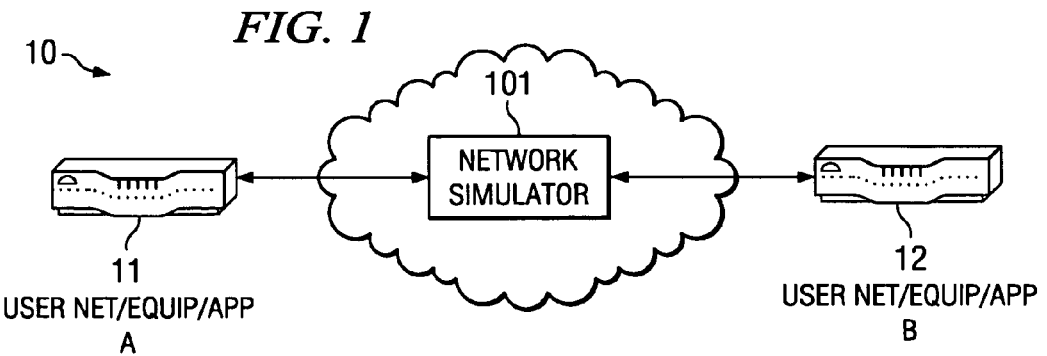
FIG. 1 shows an exemplary system employing a network simulator in accordance with certain embodiments of the present invention.

FIG. 1 shows an exemplary system 10 employing a network simulator 101 in accordance with certain embodiments of the present invention. In system 10, nodes 11 and 12 are communicating with each other. Such communication passes through network simulator 101, which can disrupt the traffic to simulate disruptions that may be encountered if such traffic were flowing across a real network. Accordingly, the network simulator 101 is an in-line network simulator through which the actual communication between nodes 11 and 12 flows, and network simulator 101 disrupts the communication between nodes 11 and 12 (e.g., by dropping packets, delaying packets, reordering packets, etc.) to simulate such communication traveling across an actual network having a certain congestion, etc. Nodes 11 and 12 may be devices, applications, processes, networks, or any other objects that may communicate across a network. Further, while two nodes are shown in the example of FIG. 1 for ease of illustration, embodiments of the present invention are not so limited. Rather, any number of nodes may be communicatively coupled together such that they can communicate with each other, wherein such communication flows through network simulator 101. By simulating the disruptions imposed by network simulator 101, the effects of such disruptions on the behavior of nodes 11 and/or 12 can be analyzed, for instance. Thus, by having the disruptions correspond to those commonly encountered/expected in an actual network environment in which the nodes are to be deployed, the performance of the nodes in such an environment can be analyzed through simulation. Thus, for example, disruption characteristics (as described further herein) that are used by network simulator 101 may correspond to characteristics known for a network environment in which the nodes are to be deployed. For instance, information regarding changes in congestion encountered on the network for various times of day, etc., may be gathered for the network environment in which the nodes are to be deployed, and such information may be used for generating the disruption characteristics to use in a simulation.

Figure 2:
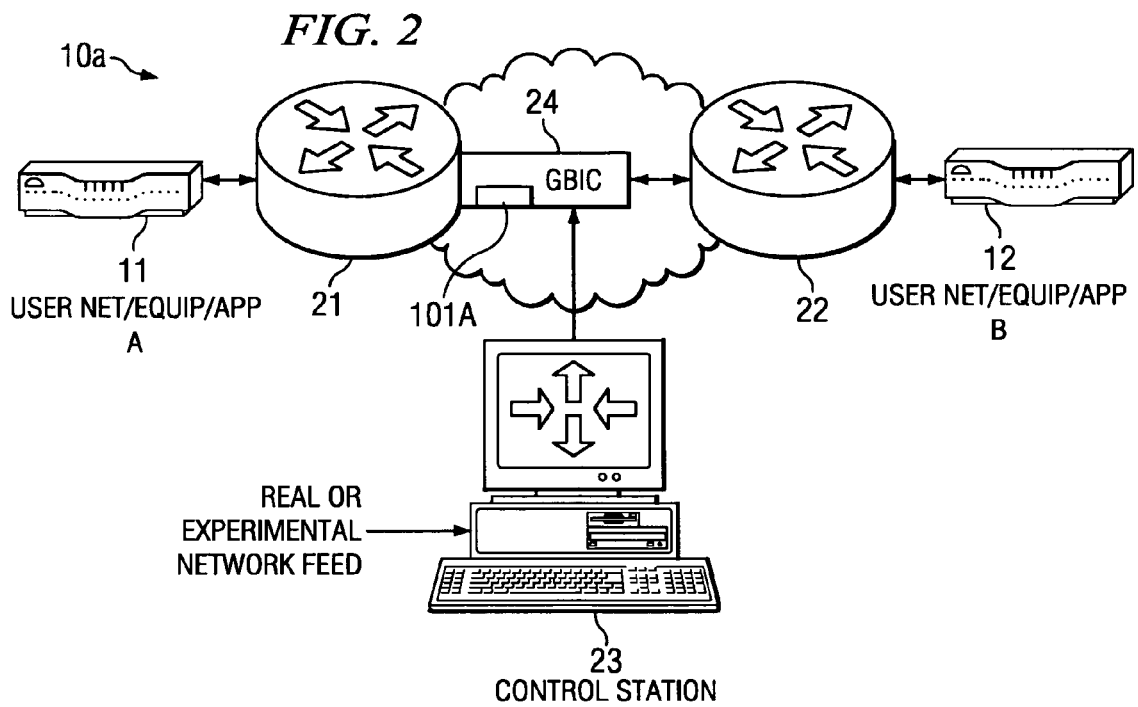
FIG. 2 shows an exemplary embodiment in which the network simulator of FIG. 1 is implemented as part of a gigabit interface converter (GBIC)

FIG. 2 shows an exemplary embodiment in which the network simulator 101 of FIG. 1 is implemented as network simulator 101A included within a GBIC (a gigabit interface converter that converts from electrical signals to optical ones and vice versa) 24 that is plugged into network equipment 21. Thus, in this example, system 10A includes nodes 11 and 12 that are communicatively coupled via network equipment 21 and 22, which may be routers and/or switches as examples, and network simulator 101A is employed as a component of GBIC 24 that is coupled to at least one of such network equipment devices, in this case device 21. In certain embodiments, control station 23 is further included, which can load configuration parameters to network simulator 101A as described further below.

In the exemplary implementation of FIG. 2, GBIC 24 contains a small ASIC or FPGA-based engine for implementing network simulator 101A, which performs network traffic load simulation for delaying passing packets or even dropping them according to a distribution characteristic downloaded from control station 23. This could be a one-time download for the duration of the experiment, or the control station 23 could continuously update the network characteristics in the network simulator 101A (e.g., based on real or experimental network feed to such control station 23). Exemplary implementations of the network simulator 101A that may be employed within GBIC 24 are described further below. Of course, while the network simulator 101A is implemented as part of a GBIC 24 in this example, embodiments of the present invention are not limited in this regard. For instance, the embodiments of a network simulator described herein may be implemented as a separate device (e.g., which may be a pluggable component that can be coupled to some network equipment, such as equipment 21 and/or to a GBIC 24, etc.) or may be implemented as an integral part of another device, such as equipment 21 and/or GBIC 24, etc. As those of ordinary skill in the art will appreciate, the exemplary hardware implementations of a network simulator described further below may be employed on any suitable platform/device.

In the example illustrated in FIG. 2, the nodes 11 and 12 are communicating across an actual network (via network equipment 21 and 22), and thus network simulator 101A is used to simulate a larger network and/or different network conditions than those actually encountered in the real network that the nodes are communicating across. In certain embodiments, the nodes 11 and 12 may simply be communicating directly with each other across the network simulator. For instance, two computers (e.g., PCs) may be arranged in an office or lab and connected to each other across the network simulator device, and the network simulator simulates certain network conditions (e.g., congestion, etc.). As an example, the network simulator device may be implemented to connect directly to one of the computers in-line with the communication flow (e.g., as part of the computer's network interface card or coupled to the communication port). If a PC has a capability to receive a pluggable in-line network simulator, such pluggable in-line network simulator may be connected to the PC and used to simulate packet drops, delays, etc., and how this effects applications on the communicating PCs may be analyzed (e.g., to determine how the applications react to packet losses, delays, etc.). If a PC does not have a slot for receiving the pluggable in-line network simulator, a switch with SFP or GBIC slot may be employed, and a SFP/GBIC that includes the simulator, such as simulator 101A described herein, may be utilized. Thus, one PC may be connected to the switch port and the other PC may be connected to the switch via the SFP/GBIC that is plugged into the switch. Thus, with a tiny network simulator, application behavior can be tested as if it is running on a large network.

As described further below, in certain embodiments the disruption characteristics of a network are downloaded from control station 23 to network simulator 101A as distribution tables. For instance, in certain embodiments two distribution tables are downloaded to the network simulator: 1) a packet delay distribution table, and 2) a packet loss distribution table. As described further below, these distribution tables may include a distribution of disruption characteristics (e.g., a distribution of delay times and packet losses), and a random number generator may be used to select a disruption characteristic from the table to be applied at a given time.

In certain embodiments, GBIC 24 may use its own random number generator to pick packet delay attributes or packet losses from the distribution table. The distribution table could also be read and used in FIFO order: This will mean that in such a mode the control station 23 should update the distribution tables continuously. There could also be a combination of both functionalities, i.e. random selection of entries in the distribution tables with continuous updates of those tables. Of course, more than one network simulator 101A could be active in the network and controlled by the control station 23.

In one embodiment, two types of distribution tables are used by the network simulator 101A. One distribution table (which may be referred to as a "packet delay table") contains values of packet delays, and the other table (which may be referred to as a "packet loss table") contains packet counts after which a packet should be dropped. For example, a packet delay table may have a sequence of entries: 20000, 20000, 20000, 20000, 40000, 40000, 100000. These values may, for example, indicate packet delays in microseconds. If this distribution table is provided to network simulator 101A via a one-time download, it may resemble a bounded exponential distribution that will generate Poisson-like packet distributions at the receiving end when the packets are sampled. The distribution, however, is not limited to being Poisson in nature but could be any other desired distribution, such as a power distribution to, for example, simulate long tailed packet delays. In one embodiment, a random number generator picks values from this table in random order during the simulation. Of course, those tables may contain at least several hundred entries to make the distribution functions more "smooth".

In the case of the packet loss tables, the values may indicate how many packets have to be transmitted before one can be dropped. Again, in this case, the values may be picked at random from the distribution table. In the case where the control station 23 continuously downloads distribution updates, the network simulator may use the values in FIFO order. In a case in which the update packets are lost and the network simulator gets to the end of the FIFO, the last update could be read again or its entries could be read in a random order.

In certain embodiments, such as the exemplary embodiment of FIG. 2 in which the network simulator functionality is implemented in GBIC 24, the logic employed for implementing such network simulator is preferably small. For instance, certain embodiments provided herein can be implemented on a silicon chip that can be placed in SFP/GBIC without changing the existing physical dimensions of those devices. The SFP/GBIC with an embodiment of in-line network simulator 101A will be undistinguishable from a normal SFP/GBIC that does not include such network simulator. In general, the SFP is typically roughly ½"×½"×2", and the GBIC is roughly 1"×½"×2" in size. In certain embodiments, the built-in chip may be approximately a few square mm die, and it may provide all network measurement capabilities besides network simulation function. The network simulator may be implemented as a factional part of such a chip. In certain embodiments, the network simulator alone may employ approximately 50-200 thousand gates of logic, whereas microprocessors often have several millions of gates. Also, in the target environments of certain embodiments, very little power is available, e.g., approximately 300 mW. Accordingly, in certain embodiments, the in-line network simulator 101A is implemented to utilize just a few mW. Certain embodiments of the in-line network simulator 101A can be produced very inexpensively, and may be implemented within a SFP/GBIC without substantially increasing the cost of the overall device. In contrast, traditional powerful network simulators are much more expensive, generally costing from several thousand dollars to several hundred thousand dollars. Such traditional network simulators are typically much larger (e.g., requiring the space of approximately two PCs), and require 100's of Watts of power.

Thus, because of its limited size, the network simulator 101A may not provide all functionality that a large network simulator may provide. Large data networks are like large storage devices. Data that travels through them is actually retained in them for some period of time. Thus, a given network may be thought of as a huge data storage device with almost unlimited capacity. To simulate this in a small device may present difficulties. For example, certain implementations of a small network simulator may not be able to delay data traffic for a long time if the data is being produced at high (e.g., gigabit) volumes, since this would require huge storage capacity within the device itself. Accordingly, the amount of delay that can be added to the network by the network simulator is proportional to the amount of memory on the network simulator device, the speed of the network, and the amount of packets the network simulator device wants to disrupt.

However, a small network simulator device may deal very well with low bandwidth traffic (say, for instance, measured in kilo bits/sec) that is traversing a network and is subject to delays. For example, voice-over-IP (VoIP) data traffic between two parties is in the range of 80 kbits/sec (200 bytes packets sent every 20 msec). A small network simulator device, such as may be implemented in GBIC 24 in the example of FIG. 2, may allow for introducing delays of even up to seconds for a high (e.g., gigabit) volume network. It should be noted that the packet classifier employed by certain embodiments of the present invention may be configured to only select a very specific type of traffic that is to be subjected to delays and packet loss, while leaving other traffic undisturbed. This is a desirable characteristic in situations, as for example, in which the network simulator is being used to diagnose a problem on a live network by affecting how a specific type of traffic (e.g., VoIP traffic) will affect applications (e.g., quality of VoIP conversations). A small network simulator device, such as the exemplary implementation of network simulator 101A described further herein as implemented in GBIC 24, may have storage of up to approximately hundreds of Kbytes. In this example, within a second, the network simulator device could absorb (delay for a second) up to 10 Kbytes of VoIP data, which is well within the storage capacity of such an exemplary device. Such an exemplary device could also easily be used for testing interactive web applications where the traffic is rather light. So, when constrained on size, there is a tradeoff between what the network simulator can do based upon the available storage capacity and traffic speed. As described further herein, certain embodiments of the present invention target small devices with limited storage capacity and provide a solution for simulating networks where the bandwidth requirements for the applications being tested are not very demanding. Of course, the concepts presented herein can be readily extended for higher bandwidth networks if a suitable amount of memory is available (or suitable size is available for adding sufficient memory).

In operation of the exemplary embodiment of FIG. 2, the control station 23 sends a distribution table to the network simulator 101A implemented in GBIC 24. Initially, the network simulator 101A may have some default distribution table built in that could either be part of the buffer initialization or could be stored inside an EEPROM that is part of the device. The following description primarily focuses on exemplary implementations for the internals of the network simulator 101A and not on how the distribution tables are calculated, recorded, or obtained otherwise. Any suitable techniques now known or later developed for calculating, recording, or otherwise obtaining such distribution tables may be employed for a given implementation of the network simulator in accordance with embodiments of the present invention.

In this exemplary embodiment, the network simulator 101A is capable of receiving configuration packets that include distribution tables as well as other attributes that trigger different functions inside the simulator. For example, the network simulator 101A may behave differently depending on the type or amount of incoming packets. Crossing certain traffic volume thresholds (number of bits/bytes or packets) may trigger the use of different delay/loss distributions, for instance, and such volume thresholds may be user-configurable (e.g., configurable via control station 23).

Figure 3:
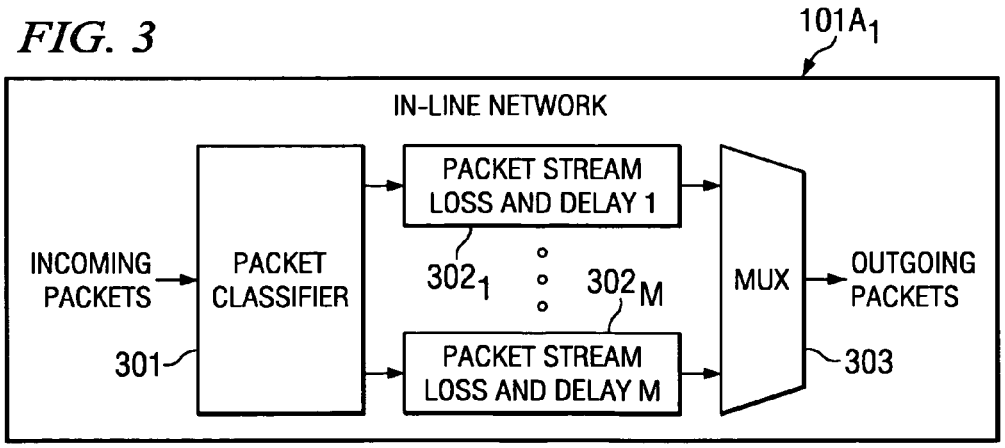
FIG. 3 shows one exemplary embodiment of the in-line network simulator of FIG. 2.

FIG. 3 shows one exemplary embodiment of in-line network simulator 101A of FIG. 2, which is shown as simulator 101A$_1$. This exemplary in-line network simulator 101A$_1$ includes packet classifier 301, which is operable to receive incoming packets and classify each packet into an appropriate one of M packet streams 302$_1$, . . . , 302$_M$. Packet classifier 301 receives incoming packets that are being communicated from a source node (e.g., node 11 of FIG. 2) to a destination node (e.g., node 12 of FIG. 2). Different packet disruption characteristics may be defined for each of the M packet streams, as described further herein. For instance, different packet delay and packet loss characteristics may be defined for each of the M packet streams. Accordingly, different types of packets received by in-line network simulator 101A$_1$ may be affected (or "disrupted") in different ways.

The packet classifier 301 may also deploy packet classification based on the current state of a specific traffic flow. In certain embodiments the packet classifier 301 may classify specific flow according to sate information, such as a volume (packet/bytes) of given flow at any given time or burst rate of traffic flow within the given time. According to some threshold values, the flow may be divided into streams. Packet classifier 301 filters may specify a specific traffic flow that is later subject to further classification based on the above mentioned parameters like volume rate or burst rate within classifier 301. The packet classifier 301, in this case, keeps counters that are reset once a specified interval expires. For example, the packet classifier 301 may measure volume rate or burst rate once per second. Of course, if there is no packet involved, the entire traffic could be just subject to such classification.

Thus, network simulator $101A_1$ includes packet classifier 301, which may be in the form of packet filters that indicate which type of packet belongs to which type of filter. In other words, the network simulator $101A_1$ may have multiple packet filters (e.g., a set of packet filters per stream) creating different packet streams $302_1, \ldots, 302_M$ with different behaviors. Packet streams are subject to packet loss and packet delays that may have different distributions for different streams. However, the network simulator $101A_1$ may itself be agnostic about those distributions. Distribution tables may be provided that are "shaped" by the control station 23 (of FIG. 2) and the network simulator simply uses them.

Accordingly, in this exemplary embodiment, different packet types are divided into separate packet streams that will have different packet delay and packet loss characteristics applied to them. Packets pass through the network simulator $101A_1$ when going from one side of the user network/system to another (e.g., when being sent from node 11 to node 12 in FIGS. 1 and 2). The in-line network simulator $101A_1$ emulates the behavior of a real network by introducing packet delay, loss and reordering. Reordering is a function of some packets getting delayed more than others. This variable delay may be added on a per-stream basis or across all packets, as described further below.

In one embodiment, the packet classifier 301 divides incoming packets into streams $302_1, \ldots, 302_M$ depending on packet filters employed by such packet classifier 301. In certain embodiments, the packet filters may be user-configurable and may be updated from time-to-time via control station 23. As an example, traffic may be divided according to type of transport (e.g. UDP versus TCP), by the size of packets, etc. information regarding type of transport can be found, for example, in the IP packet header 8 bit field that identifies next packet header, i.e. type of transport protocol (header). Also, the packet size is another field in the IP header. Using just packet size, the network simulator may be implemented to divide an incoming stream into different outgoing streams that have different characteristics of behavior with respect to packet loss and delay while traveling across the network being simulated. For example, if the packets are roughly 200 bytes (e.g., typical size of VoIP packets) then they may get higher priority (less drops, less delays) than large packets. As another example, if a file transfer is encountered, this could be put out a lower priority, as delaying it will not do too much harm. However, delaying VoIP packets over 150 msec means that such packets, and if there are too many dropped packets the conversation may be unacceptable or at least too "choppy."

As one example, a UDP packet stream with small size packets (for example representing VoIP) could be classified by packet classifier 301 in a first class and thus directed to Packet Stream Loss & Delay Module 1 (labeled $302_1$ in FIG. 3). This module $302_1$ may introduce low delays and low packet loss. That is, a corresponding distribution for packet delays and packet loss may be associated with module $302_1$ for use in disrupting the packets sent to it in a first manner. On the other hand, Packet Stream Loss & Delay module M (labeled $302_M$ in FIG. 3) may have long delays and moderate packet loss. This could be dedicated for FTP traffic, for instance. That is, a corresponding distribution for packet delays and packet loss may be associated with module $302_M$ for use in disrupting the packets sent to it in a manner different from the disruption provided by module $302_1$. Of course, the depth of such classifications may be limited depending on the complexity/size of the network simulator device. For simplicity, the network simulator $101A_1$ may be stateless and therefore not driven, for example, by the duration of the traffic flow. In other words, it will not degrade the packets in the flow over time when that flow lasts a long time. It may, however, be implemented to distinguish between HTTP and FTP traffic, for examples, based on the destination port.

In Metro Ethernet Networks (MENs for short), such as defined by the Metro Ethernet Forum, the packet classifier 301 may be used to distinguish traffic from different customers (using the VLAN id) and by CoS (Class of Service, that is indicated by VLAN priority). In this capacity, the packet classifier 301 may act as an Ethernet frame classifier because in MENs the traffic is only viewed at the link layer i.e., at the Ethernet frame level. As is well known, "VLAN" stands for Virtual LAN (more fully, Virtual Bridged LAN), and "VLAN id" indicates a specific virtual local area network. The VLAN id and VLAN priority are a part of the VLAN tag of a tagged Ethernet frame's header. Thus, packet filters may be employed by packet classifier 301 for analyzing the headers of received packets and classifying such packets based on their respective VLAN ids and/or some other state of the traffic flow.

As an example, an ISP provider may allow certain traffic flows with high QoS (Quality of Service) or CoS (Class of Service) parameters with guaranteed high-level of packet delivery i.e., low delays and low packet loss. However, if certain thresholds of the agreement (SLA) which was drawn between the customer and the network provider are exceeded, packets will experience lower-quality treatment and may be subjected to no minimum guaranteed delay or may suffer large packet loss. For example, the Metro Ethernet Forum that defines Metro Ethernet Network services distinguishes three types of packet treatment. Packet streams that are within the Committed Incoming Rate (CIR) and Committed Burst Rate (CBR) are marked as "green", and these packets are subject to an SLA (Service Level Agreement) set between the customer and network provider. As long as the customer's packets do not exceed the CIR and CBR they receive preferential treatment. Any traffic above this level is treated as "yellow," and if the traffic is really heavy (high volume and/or burst) then these packets are dropped. The packet classifier 301 may provide such traffic policing in the in-line network simulator. The packet classifier 301 measures volume rate and/or burst rate in the form of counters and compares them with configured threshold values. The determination which stream to select will be determined by the packet classifier 301 based on when a counter within a given period (lets say a second) exceeds specific (defined) threshold value.

After packets pass through the Packet Stream Loss & Delay Modules $302_1, \ldots, 302_M$ they converge again in a single packet stream, via MUX 303 in the exemplary embodiment of FIG. 3. MUX 303 selects packets in the priority of the Packet Stream Loss & Delay modules or in a round-robin fashion when more then one packet arrives at the MUX at the same time. The resulting packet stream from MUX 303 is then communicated along its communication path from a source node (e.g. node 11 of FIG. 2) to the destination node (e.g. node 12 of FIG. 2).

In certain implementations of the in-line network simulator, the packet classifier 301 may not be used (or even implemented) therein, and such implementations the in-line network simulator may have or use only one Packet Stream Loss & Delay module. However, the exemplary implementation of FIG. 3 allows for a plurality of Packet Stream Loss &

Delay modules, which may be processed in parallel via the exemplary hardware described herein.

Figure 4:
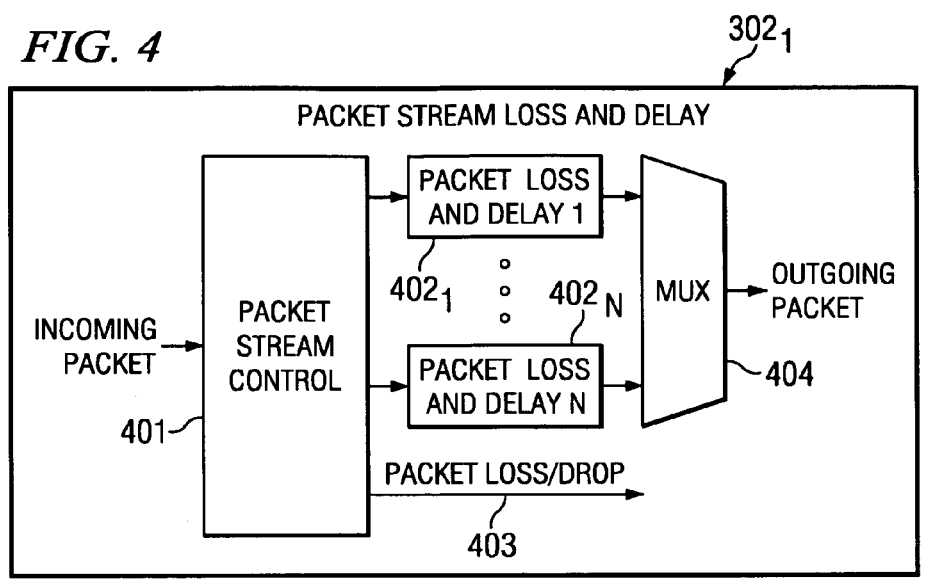
FIG. 4 shows an exemplary implementation of a Packet Stream Loss & Delay Module, such as module $302_1$ of FIG. 3, according to one embodiment of the present invention.

An exemplary implementation of a Packet Stream Loss & Delay Module, such as module $302_1$ of FIG. 3, is shown in FIG. 4. As shown in the exemplary implementation of FIG. 4, module $302_1$ may further divide the packet stream into packet sub-streams (or "sub-classifications") $402_1, \ldots, 402_N$. For instance, the exemplary implementation of module $302_1$ provided in FIG. 4 includes packet stream control unit 401, which receives the packets directed by packet classifier 301 (FIG. 3) to module $302_1$. Packet stream control unit 401 determines which of a plurality N of different sub-streams to which a received packet is to be classified. In one embodiment, packet stream control unit for all one has distribution tables that drives a selection of the outgoing stream. For example, one packet stream control may specify that at this time for this period it is setting the signal high. This packet stream controller may indicate heavy congestion. Another packet stream controller may be associated with a time when congestion is low, and so on. The signals generated are independent from incoming packets. Because the whole thing is driven by time, the controller may pick a time of, say 10:25 a.m. with a duration of 10 seconds. The next time, the controller may pick a time of, say 1:30 p.m. for 30 seconds. At the selected time, it will generate a signal, i.e. the signal will be high, and in other times the signal will be low.

So, in this example, the packet classifier 301 (of FIG. 3) may classify incoming packets as traffic flows from different users (e.g., from different VLANs), and the packet stream classifier may deal with classifying the packets as green, yellow, or red. Insert embodiments there could be in other level at the packet classifier 301 that will look at different CoS (class of service) that is derived from VLAN 3-bit priority field. A user may be subscribed to multiple VLANs, as well as each VLAN may be divided further to different CoSs in each CoS may be defined in terms of green, yellow, or red. The network simulator may use the packet stream selector that will effect yellow traffic, for example by giving it heavy packet loss and delays. Yellow traffic does not have guarantees by SLA agreement between the customer and the provider regarding maximum delay or maximum packet loss, as green traffic does.

The packet control unit 401 may also send a packet to a "bit bucket" for dropping packets via path 403, i.e. it just removes packets from the stream if certain thresholds are exceeded. Each packet sub-stream, after leaving the packet stream control unit 401 will be subject to packet loss and delay within the corresponding packet loss and delay module $402_1, \ldots, 402_N$ to which it is sent. The number N of packet loss and delay modules will depend on how many sub-streams into which the packet stream control unit divides the incoming packet stream for a given classification (e.g., Metro Ethernet packets in the above scenario). Different numbers of sub-streams may be defined for different classifications (e.g., for different modules 302), and in some instances a given module 302 may not have a plurality of different sub-stream modules 402 (e.g., if all of the traffic of the given classification is to be disrupted according to the same packet delay and loss distributions). Eventually, all sub-streams converge into one outgoing packet stream from packet loss & delay module $302_1$, via MUX 404 in the exemplary embodiment of FIG. 4. MUX 404 may select packets in the priority of the packet loss & delay modules $402_1, \ldots, 402_N$ or in a round-robin fashion when more then one packet arrives at the MUX at the same time or some other way.

As an example, packet classifier 301 of FIG. 3 may have defined packet filters that separate IP traffic from non-IP traffic by filtering on Ethernet type. If the Ethernet type is 0x800 in the Ethernet header, then this means the packet is an IP packet. Any other packets, like ICMP, ARP, DHCP, etc. will be directed to a particular stream. The IP packets within packet classifier 301 are then filtered based on protocol type found in the IP header. If the protocol type matches value of 6, it is a TCP packet and if it matches 17 it is a UDP packet. TCP packets are directed to packet stream 3021, and UDP packets on the other hand are further examined, for example, by looking into the packet size. The size of the UDP packet is filtered from the IP packet header that specifies the IP packet length (e.g., the UDP packet size may be determined as equal to the IP packet size minus the IP header size). The packet classifier 301 may have a filter setup such that if IP packet size is 300 bytes or less it is forwarded to packet loss and delay module 302K and otherwise to another packet loss and delay module (not shown in FIG. 3). Each of the packet streams will be processed by packet stream loss and delay module (FIG. 4). First, the packet stream control 401 will determined by applying specific policies, i.e. sends a signal to selector 504 as to when and for how long a packet stream will be subjected to packet loss and delay. This mimics the congestions on the network that may have different characteristics. Say, for instance, that around 10 name alone for a duration of 10 minutes the traffic is subject to heavy packet loss. Around 11 a.m., there is observed rather heavy delays with medium packet loss. This is realized by modules 501, 502, and 503 in FIG. 5. The selector 504 will direct to which packet loss & delay module 402 the UDP packet will be going at any given time. In summary, the packet classifier 301 based on packet filters creates packet streams or flows. Those streams are later subject to a specific loss and delay processing engine 402 that is driven by time (when and duration). This is realized by packet stream controller for one. The packet loss and delay module 402 will withhold packets, and as a result even when there was one packet stream entering and line simulator at classifier 301 different packet streams may be multiplexed at the same time at MUX 303. Of course, embodiments of the present invention are not limited in application to this illustrative example.

Figure 5:
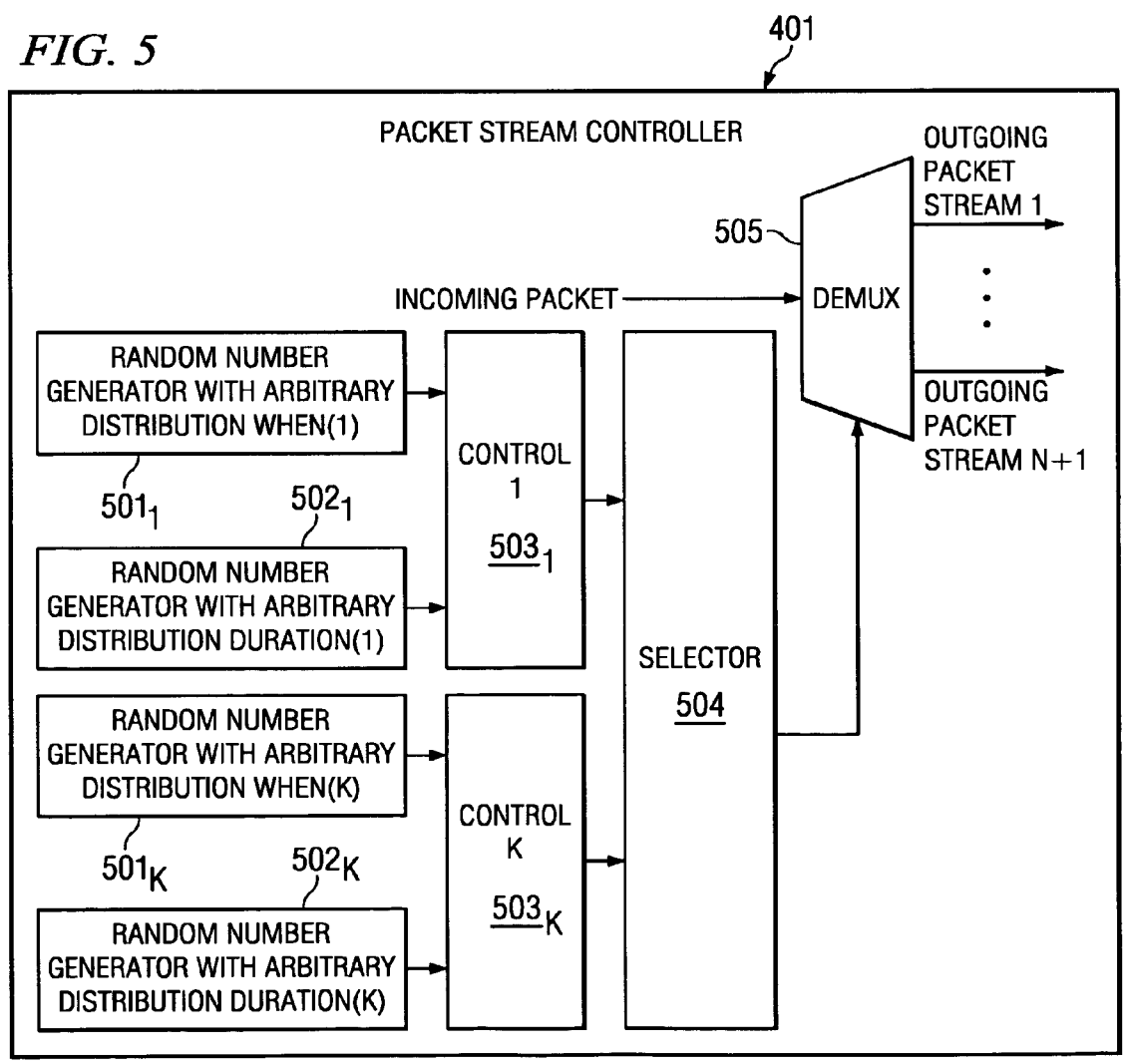
FIG. 5 shows an exemplary implementation of the packet stream control unit of FIG. 4 according to one embodiment of the present invention.

Turning to FIG. 5, an exemplary implementation of packet stream control unit 401 is shown in further detail. This exemplary implementation of packet stream control unit 401 includes control modules $503_1, \ldots, 503_K$, selector unit 504, and deMUX 505. Each of control modules $503_1, \ldots, 503_K$ has associated therewith a respective random number generator with arbitrary distribution for time characteristics (e.g., "when" and "duration"), as discussed further below. For instance, control module $503_1$ has associated therewith random number generator with arbitrary distribution $501_1$ for time of occurrence (or "when") and random number generator with arbitrary distribution $502_1$ for "duration." Similarly, control module $503_K$ has associated therewith random number generator with arbitrary distribution $501_K$ for time of occurrence (or "when") and random number generator with arbitrary distribution $502_K$ for "duration." Control modules $503_1, \ldots, 503_K$ control selector 504 for selecting, via deMUX 505, to which of packet loss & delay modules $402_1, \ldots, 402_N$ (FIG. 4) an incoming packet to packet stream control unit 401 is to be sent.

In the exemplary implementation of FIG. 5, K controls are implemented via control modules $503_1, \ldots, 503_K$. For ease of illustration, FIG. 5 shows two control modules. Such control modules control dividing a received stream into time-dependent substreams, as described further herein. In certain embodiments, these controls are driven by random number generators with distributions that could be downloaded from the control station 23 (FIG. 2). From a generic point of view, each control module receives two values: when and for how long.

As mentioned above, in the Metro Ethernet example, two control modules may be used. The first control module will indicate when the user traffic enters the "yellow" zone and the second control module will indicate when the user traffic transitions to the "red" zone, and for how long. This means, for example, that there will be three outgoing packet streams. In the "green" zone, when both controls are off, the traffic follows to substream 1 (e.g., to a first packet loss & delay module $402_1, \ldots, 402_N$ of FIG. 4). In the "yellow" zone, (if only Control 1 sets its output signal to high), the traffic will be directed to substream 2 (e.g., to a second packet loss & delay module $402_1, \ldots, 402_N$ of FIG. 4), and in the "red" zone (Control 2 sets its output signal to high), the traffic is directed to substream 3, which may be a bit bucket (e.g., packet loss/drop 403 in FIG. 4). Selector 504 picks the proper outgoing substream based on the control modules output signals.

Figure 6:
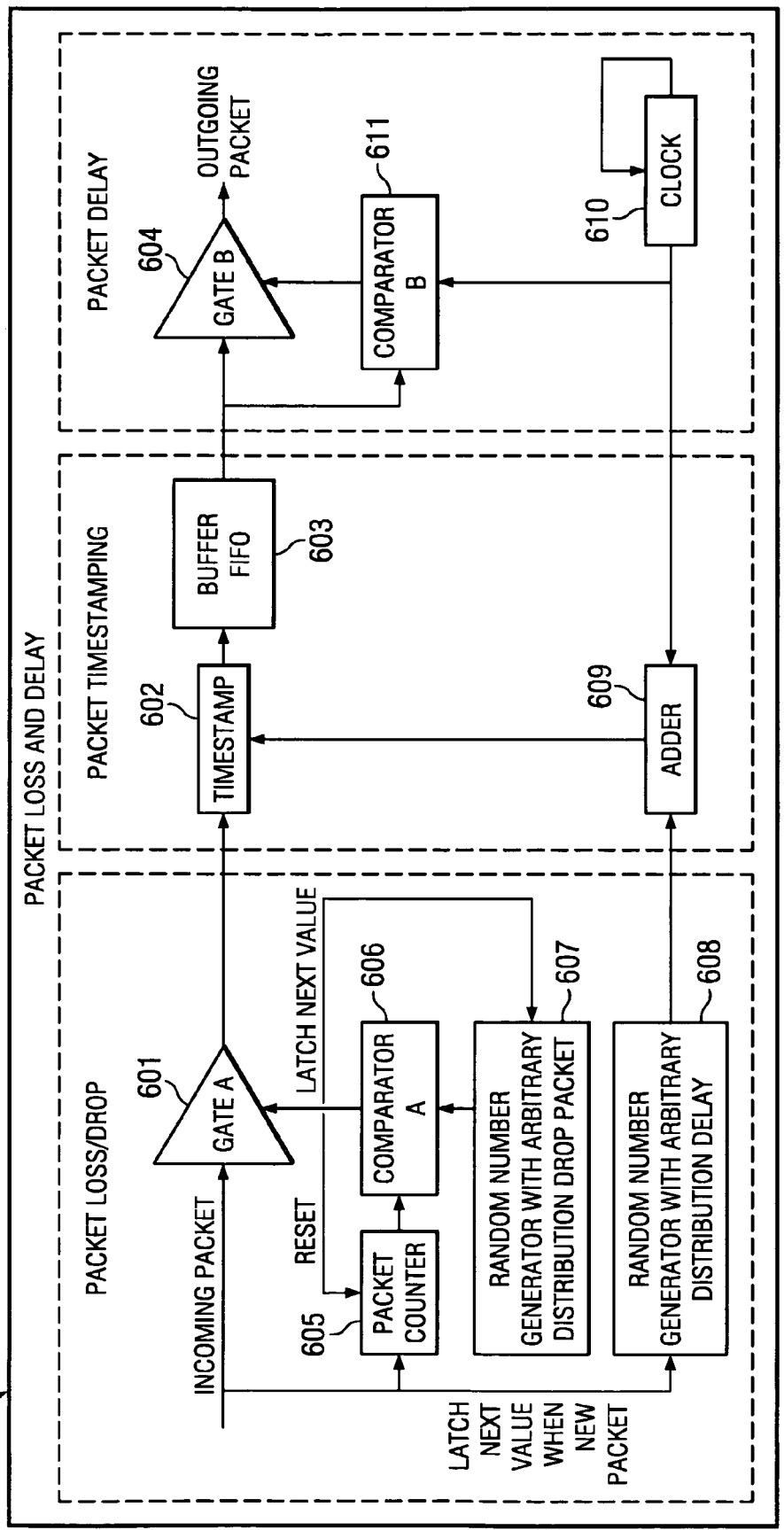
FIG. 6 shows an exemplary implementation of a packet loss & delay module, such as module $402_1$ of FIG. 4, according to one embodiment of the present invention.

FIG. 6 shows an exemplary implementation of a packet loss & delay module, such as module $402_1$ of FIG. 4, according to one embodiment of the present invention. Exemplary module $402_1$ of FIG. 6 includes gate 601, timestamp module 602, buffer 603, gate 604, packet counter 605, comparator module "A" 606, random number generator with arbitrary distribution for dropping packets 607, random number generator with arbitrary distribution for delaying packets 608, adder 609, clock 610, and comparator module "B" 611. In operation, a packet arriving at module $402_1$ generates an event directed to packet counter 605 and to module 608. Packet counter 605 increments its count of packets. Module 608 generates a delay value. Before the packet is forwarded, comparator module 606 determines whether the drop packet count is reached by comparing the value given by the random generator 607 with the value obtained from packet counter 605. If these values match, comparator 606 signals gate 601 to not forward the packet and resets the counter 605 to 0. Modules 608 will only generate a value if the packet is not dropped. The delay value from module 608 is added to the current clock value (time), provided by clock 610, and by doing so it creates a timestamp (a time in the future). This timestamp, at timestamp module 602, is first inserted into a FIFO 603. The first item "visible" by comparator module 611 from the FIFO 603 will be the timestamp. This means that comparator 611 "reads" a timestamp from the FIFO 603 if such a timestamp arrives in the FIFO, otherwise it waits. In one implementation, comparator 611 inserts a read enable signal into FIFO 603 when FIFO 603 signals it is not empty. In other words, comparator 611 only reads a timestamp if FIFO 603 signals that it is non-empty. Then, comparator 611 compares the read timestamp value with the current clock's time. If the values match, comparator 611 signals gate 604 to start reading data from the FIFO 603. In one implementation, gate 604 reads the data by inserting a FIFO read enable signal until it sees the end of the packet. There are many ways that those of ordinary skill in the art will recognize to employ for detecting the end of the packet.

This exemplary implementation of packet loss & delay module $402_1$ simulates the packet loss and delay of a specific stream received from packet stream controller 401 (FIG. 4). In this embodiment, the distribution tables provided by the control station 23 (FIG. 2) drive the packet loss and packet distribution. In other words, the in-line network simulator knows nothing about the traffic distribution, it just executes what it is asked to do; e.g., drop packets or delay packets according to the given specific values and distribution. This makes the implementation of such an in-line network simulator very simple and easy to implement in devices with limited processing and storage capabilities. This also means that the exemplary implementation of the in-line network simulator does not require algebraic calculation, such as floating point calculation that is expensive in an ASIC or FPGA type device. In certain embodiments, any statistical distribution algorithms that require such functionality, may have its calculations delegated to more powerful devices like the control station 23 (such as a PC or laptop, as examples). These calculations do not have to keep up with traffic flow and therefore can be delegated to the off-line facility.

The exemplary implementation of packet loss & delay module $402_1$ in FIG. 6 performs three functions: dropping packets, packet timestamping, and packet delaying. The packet timestamping and delaying actually work together in this example. The packet timestamping is used for indicating when a packet could be sent out or read from the FIFO 603. The packet loss and delay are driven by the random number generators 607 and 608 whose distribution is again controlled by the control station 23.

Thus, in one embodiment, traffic from a source node to a destination node is received at the in-line network simulator 101A, and a packet classifier 301 may filter the received packets into corresponding types of streams (e.g., UDP versus TCP streams). For a given stream, a controller 401 determines time characteristics specifying time of occurrence and for how long portions of the stream should be treated in a certain way (e.g., when and for how long a certain congestion condition is to occur on the simulated network). Based on these time characteristics, the received stream is divided into different time-dependent substreams, and each respective substream has corresponding disruption characteristics (e.g., packet delay and/or loss distributions) that it uses for disrupting its packets. Different distributions may be provided to different ones of packet loss & delay modules $402_1$-$402_N$, and thus different disruptions (e.g., different number/rate of packet delays and/or drops) by the different substreams. Accordingly, the time-dependent substreams divided by controller 401 may be disrupted differently.

FIG. 7 shows an operational flow diagram for certain embodiments of the present invention. As shown, in operational block 701 an in-line network receives packets sent from a source node to a destination node. In operational block 702, the in-line network simulator classifies the received packets into respective ones of a plurality of different classifications. For instance, as described above received packets may be classified as UDP or TCP packets. Any number of such classifications may be implemented. In operational block 703, the in-line network simulator disrupts the received packets based on corresponding disruption characteristics defined for their respective classifications. That is, the network simulator selectively delays, drops, and/or reorders the received packets based on the corresponding disruption characteristics (e.g. packet delay tables and packet loss tables).

FIG. 8 shows a more detailed operational flow diagram for the exemplary embodiment of in-line network simulator $101A_1$ described above in FIGS. 3-6. In operational block 80, packet classifications to be used by the in-line network simulator are defined. For instance, as described above packet classifications such as UDP and TCP may be defined. In certain implementations, such packet classifications are defined by downloading (e.g., from control station 23) packet filters to packet classifier 301, as in sub-operational block 801. Such downloaded packet filters may specify how to use information associated with received packets for classifying the packets into various classifications.

In operational block 81, respective disruption characteristics are defined for each of the classifications. For instance, in certain implementations such disruption characteristics are defined by packet delay tables and packet loss tables that are downloaded (e.g., from control station 23) to the in-line network simulator. In operational block 82, the packet classifier 301 receives incoming packets sent from a source node to a destination node. In operational block 83, packet classifier 301 in classifies each received packet into a corresponding one of the defined packet classifications (e.g., UDP or TCP classifications), and sends each packet to a corresponding packet stream loss & delay module 302 based on the packet's classification.

In operational block 84, packet stream loss & delay module 302 disrupts the packets sent thereto based on the disruption characteristics defined for the corresponding classification. As described above, in certain implementations one or more of the packet stream loss & delay modules 302 may include a plurality of sub-stream modules 402. Accordingly, in such implementations packet stream control unit 401 receives incoming packets and further classifies such received packets into sub-streams, and sends each packet to a corresponding packet sub-stream loss & delay module 402 based on the packet's further classification, as in block 803. More specifically, in one embodiment the modules shown in FIG. 5 for implementing packet stream control unit 401 are utilized in operational block 804 to divide a packet stream into time-dependent substreams. In such an embodiment, modules 501 (FIG. 5) generate a signal based on time, i.e. when the signal will occur, and module 502 determines for how long the signal should stay on. While such signal is one, the corresponding packets received in this stream are sent to a corresponding substream (determined by the control signals that are "on" as discussed further hereafter). In one embodiment, module 501 sends a signal to control unit 503 instructing the control unit 503 as to the time to employ (e.g., for comparing current time with timestamp that was generated by using random number generator). Control module 503 will then ask module 502 for how long this event should occur. Thus, modules 501 and 402 generate time characteristics (time of occurrence and duration) that are used by selector 504 for dividing the packet stream into substreams. There are multiple sets of modules 501, 502, and 503 that generate such time characteristic signals. The selector 504, based on those signal combinations (combinations of active signals from controllers 503), selects to what outgoing substream the incoming stream should be directed. It does this by controlling deMUX 505. There could be multiple signals coming from control modules 503 to selector 504, and selector 504, based on some form of policy, decides which substream to choose. In brief, modules 501 and 502 send signals defining the time characteristics for a disruption event (when the event occurs, i.e. time is reached, and for how long). A valuation is done by the control unit 503, which sends the signal to selector 504. Selector 504, based on received signals and its own policy, chooses an outgoing substream by controlling deMUX 505. In general, only one outgoing substream is selected in any given time. It should be noted that switching substreams will only occur in this exemplary embodiment between packets and not in the middle of a packet.

In operational block 805, the packet loss & delay module 402 to which a packet (of a corresponding substream) is sent from packet stream control unit 401 is used to disrupt such packet according to corresponding disruption characteristics defined for such substream. More specifically, in one embodiment the modules shown in FIG. 6 for implementing a packet loss & delay module 402 are utilized in operational block 806.

In such an embodiment, arrival of a packet is checked whether it is subject of packet drop by comparing packet count 605 with generated random number 607 at comparator 606. If the packet is not subject to being dropped, comparator 608 generates a delay value that when added to the current time of clock 610 creates a timestamp 602 ("time in the future"). This timestamp is then inserted into FIFO 603 before any packet data. Then, the packet's data is written into FIFO 603. In one implementation, timestamp 602 sets high FIFO 603's write enable signal and data is written into the FIFO. The write enable signal stays high until the end of the packet. At the same time, on the other end of the spectrum, comparator 611 reads a timestamp from FIFO 603 and compares it with the actual time of clock 610. If these times match, comparator 611 signals gate 604 to start reading data from FIFO 603 and send it to the output. Reading stops when the end of the packet is found, and comparator 611 repeats the process. The above processes (i.e., writing to the FIFO and reading from it) are running in parallel and independent from each other. In one implementation, comparator 611 waits for a signal "empty" going low (indicating the FIFO is non-empty), and then inserts a "read enable" signal to FIFO 603 and reads only the timestamp. So, if the timestamp is 8-bytes long and the FIFO word is 16-bits, then the "read enable" stays ON only for 4 clock cycles in one implementation. By the end of the 4 clock cycles, comparator 611 has the timestamp in its register and it can start comparing with the current time that is coming from clock 610. Once these values match, comparator 611 sends a signal to gate 604 to start reading the packet data from FIFO 603. This means that gate 604 is a very simple module, which takes a signal from comparator 611 and sets a flip-flop so it gets a continuous signal that drives "read enable" of FIFO 603. As soon as gate 604 sees the end of the packet data, it resets the flip-flop, and by doing so drops the "read enable" signal.

In operational block 85 the outgoing packet from gate "B" 604 (FIG. 6) arrives at MUX 404 (FIG. 4), which controls sending of packets from packet loss & delay modules 402. In operational block 86 the outgoing packet from MUX 404 arrives at MUX 303 (FIG. 3), which controls sending of packets (that are not dropped) from packet stream loss & delay modules 302 to the destination node.

In view of the above, according to certain embodiments, a packet classifier 301 is implemented that is operable to classify packets (e.g., based on packet type and/or packet size, volume or burst rate) into different packet streams. For instance, the packet classifier 301 may filter received traffic based on packet filters employed thereby to create independent packet streams. This may, for instance, enable filtering of certain types of packets that are of interest for a given analysis into a stream for disruption thereof, while allowing other types of packets to flow undisrupted. The packet streams are subject to packet stream controllers 401 that simulate time dependencies. This means that streams are further divided into substreams created in time, independent of what the packets represent within a given stream. In other words, time-dependent substreams are created. The substreams are subject to packet count and time delay (again regardless of what the packets represent in the substream) based on the corresponding distributions assigned to each substream. The packet stream controller 401 determines that at a given time (random number for "when"=current time+interval given by the random number generator) and the duration (another random number) provides a signal that is active, and based on those signals that are active at a given time, the selector 504 assigns packets of the incoming stream to a particular substream having a very specific packet loss and delay engine. In other words, the packet stream simulator drives traffic congestion in time, e.g., when there are very heavy packet loss and long delay in time and when there are lighter conditions.

Exemplary techniques for how congestion conditions can be simulated using techniques for dropping packets and delaying packets in a hardware solution are described above with in-line network simulator 101A. Combination of multiple streams and muxing them back into a single stream will also create situations in which leaving packets will be in different order than when they enter the simulator. Rather than providing explicit control for which packets to drop/delay, the exemplary embodiment of in-line network simulator 101A operates in a non-deterministic way using random generators on streams of packets. The in-line network simulator 101A first looks at packets received by classifier 301 to classify the packets into appropriate streams, and then the simulator just operates on each stream for applying disruption characteristics without regard to what type of packets are in each stream (i.e., the in-line network simulator is agnostic as to the packets to which it is applying a given disruption characteristic, such as packet loss and delay distributions). All streams and substreams may be processed in parallel in hardware. With such a hardware implementation, true parallel processing can be achieved, as opposed to a software solution that mimics parallelism.

While a specific exemplary hardware implementation of an in-line network simulator 101A is described above with FIGS. 3-6 and the operational flow of FIG. 8, the scope of the present invention is not limited to this exemplary implementation. Rather, this provides an illustrative example, and the concepts described herein may be implemented in various other configurations (e.g., in other hardware-based implementations, etc.).

FIG. 9 shows an operational flow diagram for one embodiment of the present invention. In operational block 901, a packet stream is received at a controller, such as controller packet stream controller 401 of FIG. 4. In block 902, the controller divides the packet stream into different time-dependent packet substreams, such as the substreams sent to packet loss & delay modules $402_1$-$402_N$ in FIG. 4. In block 903, the packets of each substream are disrupted based on corresponding disruption characteristics. For instance, different packet loss and delay characteristics (e.g., distributions) may be defined for each of the substream modules $402_1$-$402_N$, and the corresponding packet loss and delay characteristics defined for a given substream module are applied to the substream received by such module for disrupting packets of the substream. The substreams are time-dependent in certain embodiments because the packet stream controller 401 selectively generates different time characteristics, e.g. time of occurrence (or "when") and duration, such as described above in connection with FIG. 5, for determining how to divide the stream into different substreams.

In certain embodiments, the exemplary operational flow of FIG. 9 is performed on a stream received from a packet classifier, such as packet classifier 301 in FIG. 3. Thus, as described above, received packets may, in certain embodiments, be filtered by a packet classifier 301 to determine to which of a plurality of different streams to send each packet, and the above process of FIG. 9 may be performed for one or more of the different streams. Of course, different distributions (i.e., different disruption characteristics) and/or time characteristics may be defined for different streams (e.g., UDP streams could be disrupted differently than TCP streams). In certain other embodiments, classifier 301 may be omitted. For instance, if the type of packets that are incoming are controlled/known or if a common disruption distribution is to be employed for all types of incoming packets, then such classifier 301 may be omitted in such embodiments.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
receiving, at an in-line network simulator, packets sent from a source node to a destination node;
classifying, by said in-line network simulator, the received packets into respective ones of a plurality of different classifications; and
disrupting, by said in-line network simulator, the received packets based on corresponding disruption characteristics defined for their respective classifications;
wherein said disrupting further comprises:
receiving, at a first controller, a stream of packets of a first classification;
dividing, by said first controller, said stream of packets of the first classification into a plurality of different time-dependent packet substreams; and
disrupting packets of at least one of said plurality of different time-dependent packet substreams based on corresponding disruption characteristics;
receiving, at a second controller, a stream of packets of a second classification;
dividing, by said second controller, said stream of packets of the second classification into a plurality of different time-dependent packet substreams; and
disrupting, based on corresponding disruption characteristics, packets of at least one of said plurality of different time-dependent packet substreams into which the stream of packets of the second classification are divided.

2. The method of claim 1 wherein said disrupting comprises:
selectively performing at least one of delaying, dropping, and reordering of said received packets.

3. The method of claim 1 further comprising:
defining said disruption characteristics as distributions for at least one of packet delay and packet loss.

4. The method of claim 3 wherein said distributions are based on distributions observed for a network to be simulated.

5. The method of claim 3 wherein said distributions include at least one bounded exponential distribution.

6. The method of claim 3 wherein said defining said disruption characteristics comprises:
providing a packet delay distribution table and a packet loss distribution table to said in-line network simulator.

7. The method of claim 6 wherein said providing comprises:

downloading said packet delay distribution table and said packet loss distribution table to said in-line network simulator from a control station via a communication network.

8. The method of claim 6 further comprising:
associating said packet delay distribution tables and packet loss tables with corresponding packet classifications.

9. The method of claim 1 wherein said classifying comprises:
classifying the received packets based at least in part on type of the received packets.

10. The method of claim 9 wherein type of the received packets comprises IP packet and non-IP packet types.

11. The method of claim 9 wherein type of the received packets comprises TOP and UDP packet types.

12. The method of claim 1 wherein said classifying comprises:
classifying the received packets based in part on at least one of traffic volume rate and burst rate of the received packets.

13. The method of claim 1 wherein said classifying comprises:
classifying the received packets based at least in part on packet size.

14. The method of claim 1 wherein said corresponding disruption characteristics of a substream comprises defined distributions for at least one of packet delay and packet loss.

15. The method of claim 1 wherein said disrupting packets of at least one of said plurality of different time-dependent packet substreams into which the stream of packets of the second classification are divided and said disrupting packets of at least one of said plurality of different time-dependent packet substreams into which the stream of packets of the first classification are divided are performed in parallel.

16. The method of claim 15 wherein said parallel comprises separate hardware components performing the disrupting operations in parallel.

17. The method of claim 1 wherein said dividing further comprises:
said controller generating random time characteristics;
said controller assigning packets of said stream among said plurality of different time-dependent packet substreams based on the time characteristics.

18. The method of claim 17 wherein said generating random time characteristics further comprises:
said controller generating a random time of occurrence signal; and
said controller generating a random duration signal.

19. A method comprising:
defining a plurality of different packet classifications;
defining, for each of said different packet classifications, a respective packet disruption characteristic;
receiving, at an in-line network simulator, packets sent from a source node to a destination node;
classifying, by said in-line network simulator, the received packets into respective ones of said plurality of different packet classifications; and
disrupting, by said in-line network simulator, the received packets based on the corresponding packet disruption characteristic of the packet classifications;
wherein said disrupting further comprises:
receiving, at a first controller, a stream of packets of a first classification;
dividing, by said first controller, said stream of packets of the first classification into a plurality of different time-dependent packet substreams;
disrupting packets of at least one of said plurality of different time-dependent packet substreams based on corresponding disruption characteristics;
receiving, at a second controller, a stream of packets of a second classification;
dividing, by said second controller, said stream of packets of the second classification into a plurality of different time-dependent packet substreams; and
disrupting, based on corresponding disruption characteristics, packets of at least one of said plurality of different time-dependent packet substreams into which the stream of packets of the second classification are divided.

20. The method of claim 19 wherein said disrupting comprises:
selectively performing at least one of delaying, dropping, and reordering of said received packets.

21. The method of claim 19 wherein said corresponding disruption characteristics of a substream comprises defined distributions for at least one of packet delay and packet loss.

22. The method of claim 19 wherein said disrupting packets of at least one of said plurality of different time-dependent packet substreams into which the stream of packets of the second classification are divided and said disrupting packets of at least one of said plurality of different time-dependent packet substreams into which the stream of packets of the first classification are divided are performed in parallel.

23. The method of claim 22 wherein said parallel comprises separate hardware components performing the disrupting operations in parallel.

24. The method of claim 19 wherein said dividing further comprises:
said controller generating random time characteristics;
said controller assigning packets of said stream among said plurality of different time-dependent packet substreams based on the time characteristics.

25. The method of claim 24 wherein said generating random time characteristics further comprises:
said controller generating a random time of occurrence signal; and
said controller generating a random duration signal.

* * * * *